US009692896B2

(12) United States Patent
Jaffer et al.

(10) Patent No.: US 9,692,896 B2
(45) Date of Patent: Jun. 27, 2017

(54) COMMUNICATION DASHBOARD WITH DYNAMICALLY CONFIGURED INTERFACE

(71) Applicant: Oracle International Corporation, Red Wood Shores, CA (US)

(72) Inventors: Akbar Jaffer, Union City, CA (US); Richard Dean Day, Ashburn, VA (US); Ming Wang, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 373 days.

(21) Appl. No.: 14/170,035

(22) Filed: Jan. 31, 2014

(65) Prior Publication Data
US 2014/0211934 A1 Jul. 31, 2014

Related U.S. Application Data

(63) Continuation of application No. 12/118,070, filed on May 9, 2008, now Pat. No. 8,666,929.

(51) Int. Cl.
*G06N 99/00* (2010.01)
*G06Q 10/00* (2012.01)
(Continued)

(52) U.S. Cl.
CPC .......... *H04M 3/5191* (2013.01); *G06Q 10/10* (2013.01)

(58) Field of Classification Search
CPC ..................................................... G06N 99/00
See application file for complete search history.

(56) References Cited

U.S. PATENT DOCUMENTS

| 5,732,229 A | 3/1998 | Dickinson ..................... 715/764 |
| 5,819,263 A | 10/1998 | Bromley et al. .................. 707/3 |

(Continued)

FOREIGN PATENT DOCUMENTS

| EP | 1143667 A2 | 10/2001 | |
| WO | WO 98/38823 | 9/1998 | ............... H04Q 7/34 |
| WO | WO 02/03292 A2 | 1/2002 | ............. G06F 17/60 |

OTHER PUBLICATIONS

"Proposal for CRM thru SMS," retrieved on Feb. 19, 2009, available via the Internet at: http://web.archive.org/web/20060507112137/http://www.positivecomsol.com/pdf/smsbankingbrief.pdf, 3 pp.
"Contact," Applied Business Technologies Copyright © 2001-2007, available via the Internet at: http://www.appliedcorp.com/messaging/call_center.html, 3 pp.
(Continued)

*Primary Examiner* — Vincent Gonzales
(74) *Attorney, Agent, or Firm* — Sheppard, Mullin, Richter & Hampton LLP

(57) ABSTRACT

The method and system of the present invention include, responsive to a receipt of a customer input, customizing an agent interface menu. The customizing includes selecting a plurality of action items for the agent interface menu, and ordering the plurality or more action items in the agent interface menu. The customizing is performed using the customer input and an item of stored customer information. The method further includes presenting an item of the customer input in an agent interface. The agent interface includes the agent interface menu, a communication window, and a customer attributes display. Responsive to a selection of one of the plurality of action items, wherein the plurality of action items is presented by the agent interface menu, an input field in a form provided in support of an action selected from the agent interface menu is populated with the customer input received from the customer interface.

20 Claims, 10 Drawing Sheets

(51) Int. Cl.
*H04M 3/51* (2006.01)
*G06Q 10/10* (2012.01)

(56) References Cited

U.S. PATENT DOCUMENTS

| | | | |
|---|---|---|---|
| 5,835,084 A | 11/1998 | Bailey et al. | 715/783 |
| 5,974,135 A | 10/1999 | Breneman et al. | 379/265.04 |
| 6,100,873 A | 8/2000 | Bayless et al. | 345/593 |
| 6,285,364 B1 | 9/2001 | Giordano et al. | 715/804 |
| 6,404,884 B1 | 6/2002 | Marwell et al. | 379/265.13 |
| 6,687,241 B1 | 2/2004 | Goss | 370/352 |
| 6,826,745 B2 | 11/2004 | Coker et al. | 717/115 |
| 6,874,119 B2 | 3/2005 | Macleod Beck et al. | 715/500.1 |
| 7,107,068 B2 | 9/2006 | Benzon et al. | 455/466 |
| 7,272,716 B2 | 9/2007 | Haller et al. | 713/156 |
| 8,666,929 B2 | 3/2014 | Jaffer et al. | 706/62 |
| 2002/0087385 A1 | 7/2002 | Vincent | 705/10 |
| 2003/0206621 A1 | 11/2003 | Pennington et al. | 379/265.01 |
| 2004/0151300 A1 | 8/2004 | Marwell et al. | 279/265.13 |
| 2005/0002514 A1 | 1/2005 | Shafiee et al. | 379/265.09 |
| 2005/0117733 A1 | 6/2005 | Widger et al. | 379/221.05 |
| 2005/0193055 A1* | 9/2005 | Angel | G06Q 30/02 709/202 |
| 2006/0047568 A1 | 3/2006 | Eisenberg et al. | 705/14 |
| 2007/0094135 A1 | 4/2007 | Moore et al. | 705/40 |
| 2007/0127693 A1 | 6/2007 | D'Ambrosio et al. | 379/265.06 |
| 2007/0174390 A1 | 7/2007 | Silvain et al. | 709/204 |
| 2007/0198944 A1 | 8/2007 | Viswanathan et al. | 715/778 |
| 2008/0052377 A1* | 2/2008 | Light | G06Q 10/107 709/218 |
| 2008/0172574 A1* | 7/2008 | Fisher | G06Q 10/06 714/25 |
| 2008/0235604 A1 | 9/2008 | Ebert | 715/763 |
| 2009/0225967 A1 | 9/2009 | Koch | 379/142.06 |
| 2011/0202867 A1 | 8/2011 | Viswanathan et al. | 715/781 |

OTHER PUBLICATIONS

"Wells Fargo Launches Mobile Text Banking Service," Wells Fargo, Oct. 22, 2007, available via the Internet at: http://www.businesswire.com/portal/site/home/indcx.jsp?cpi-content=NEWS_VIEW_POPUP_TYPE&newsId=20071022005465&ndmHsc=v2*A1190458800000*B1193086736000*DgroupByDate*J2*L1*N1000837*Zmobile%2520banking%2520wells%2520-fargo&newsLang=en&beanID=202776713&viewID=news_view_popup, 2 pp.

"The First CRM Text Messaging Solution for Auto Dealers," Feb. 9, 2008, available via the Internet at: http://cardealerforums.com/products-technology/t127531-first-crm-text-messaging-solution-auto-dealers.html, 2 pp.

"Mobile Reply—CRM by SMS," retrieved on Feb. 19, 2009, available via the Internet at: http://www.mobilereply.com/crm.html, 5 pp.

"mBlox—Call centers," © 2009 mBlox Inc., available via the Internet at http://www.mblox.com/solutions/mobile-business/call-centers.php, 2 pp.

"Applications—text messaging," Copyright © 2004-2008 Blast Companies L.L.C., available via the Internet at http://www.blastcompanies.com/broadcast-messaging-applications/text_messaging.htm, 4 pp.

"SuiteSMS," Copyright © 2008 Advanced Telecom Services, available via the Internet at: http://www.advancedtele.com/mobile-content.htm?page=nav, 2 pp.

Paul Greenberg, "CRM—Anytime, Anywhere," retrieved on Feb. 19, 2009, available via the Internet at: http://www.blackberry.com/solutions/resources/CRM_for_the_Professional_on_the_Go_v1.pdf, 14 pp.

H. Bernett and M. Jaramillo, "Assessing Web-Enabled Call Center Technologies", IT Pro, May/Jun. 2001, pp. 24-30.

M. Kriegsman and R. Barletta, "Building a Case-Based Help Desk Application," IEEE Expert, 1993, pp. 18-26.

C. Halverson, T. Erickson, and M. Ackerman, "Behind the Help Desk: Evolution of Knowledge Management System in a Large Organization," ACM CSCW '04, col. 6, Is. 3, Nov. 6-10, 2004, pp. 304-313.

Microsoft, MS Outlook 2000 SP-3, 2000, Microsoft Corp, 9.0.0.6627, Screenshots only, 8 pages.

\* cited by examiner ically configured agent interface menu in accordance with the present invention.

COMMUNICATION DASHBOARD WITH DYNAMICALLY CONFIGURED INTERFACE

CROSS-REFERENCE TO RELATED APPLICATIONS

This application is a continuation of U.S. patent application Ser. No. 12/118,070, entitled "Communication Dashboard With Dynamically Configured Agent Interface" filed May 9, 2008, and naming Akbar Jaffer, Richard Dean Day and Ming Wang as the inventors. This application is assigned to Oracle International Corporation, the assignee of the present invention, and is hereby incorporated by reference in its entirety and for all purposes as if completely and fully set forth herein.

BACKGROUND

Agent interfaces are becoming increasingly sophisticated in their ability to facilitate a variety of actions and allow access to numerous types of application data and/or application systems across multiple forms of communication. For example, a typical customer service application may include an agent interface to allow a customer service agent to navigate among a variety of types of data related to a customer and to products. Such product data may include a knowledge base or other database of product information, while customer data may include contact information, service request information, order information, activity information, and so on. Actions that that a customer service agent may want to perform may include, for example, order entry, status checks and service requests. A customer service agent interacting with a customer may need to navigate quickly all of these types of information and actions during, for example, the course of a single telephone conversation or online pseudo-real-time communication. Additionally, a subset of both the customer data and the product data may be available to the customer for self-guided retrieval of information without agent intervention.

In order to provide personalized service, it is desirable that customer service agents appear to "know" the customer immediately when starting an interaction and throughout its duration. It is also critical that the customer service agent be able to apply that knowledge to efficiently execute actions such as closing a sale. Since customer service centers receive a large volume and variety of customer interactions during a typical day, each agent needs to have quick access to important customer information, such as contact name, account number, phone number, and so on, in the performance of actions using the user interface. Additionally, customer service agents need to find, in the most efficient manner possible, the information needed by the applications that receive entry of orders and perform online business. When an agent wastes time by fumbling with an agent interface for an action, such as a sale, possibly incorrectly entering data, or offering a product that the customer will find inappropriate to his needs, costs are increased. These costs come in both the form of agent time and the form of customer dissatisfaction.

SUMMARY

The method and system of the present invention include, responsive to a receipt of a customer input, customizing an agent interface menu. The customizing includes selecting a plurality of action items for the agent interface menu, and ordering the plurality or more action items in the agent interface menu. The customizing is performed using the customer input and an item of stored customer information. The method further includes presenting an item of the customer input in an agent interface. The agent interface includes the agent interface menu, a communication window, and a customer attributes display. Responsive to a selection of one of the plurality of action items, wherein the plurality of action items is presented by the agent interface menu, an input field in a form provided in support of an action selected from the agent interface menu is populated with the customer input received from the customer interface.

BRIEF DESCRIPTION OF THE DRAWINGS

The present invention may be better understood, and its numerous objects, features and advantages made apparent to those skilled in the art by referencing the accompanying drawings.

Figure 1A:
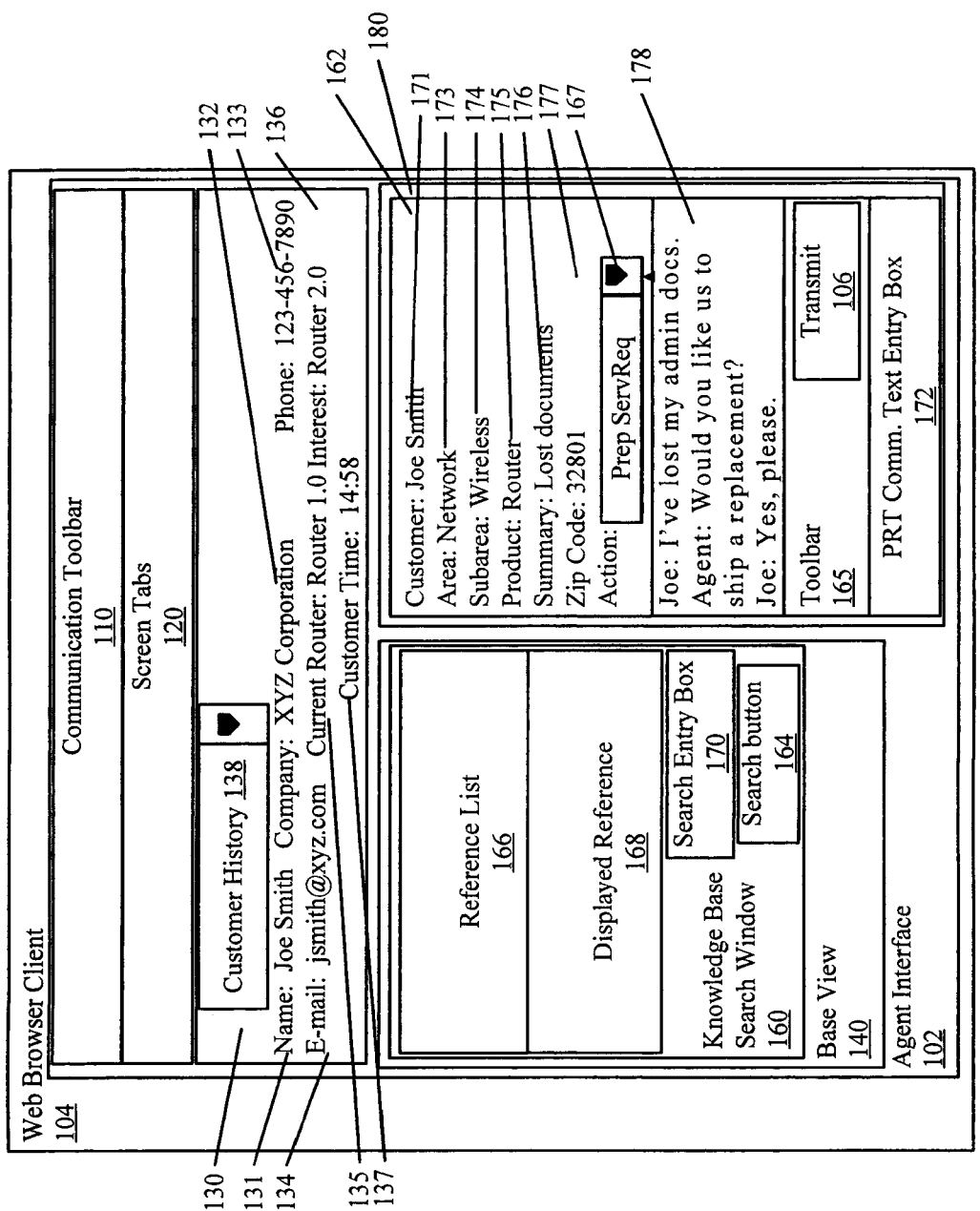
FIG. 1A provides an example of an agent interface including both a search utility and a pseudo-real-time communication utility with a dynamically configurable agent interface menu in accordance with one embodiment of the present invention.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with one or more embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent in light of the present disclosure, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention addresses several shortcomings of existing techniques. Specifically, one embodiment of the present invention provides dynamic configuration and of menus and pre-population of forms on the basis of customer and agent input. Using one embodiment of the present invention, the content of a menu and the pre-population of data in a form can be driven by user input or by a search request from an agent, for example, and the order of items on a menu can be tuned on the basis of items previously viewed by the customer and the agent.

FIG. 1A shows an agent interface 102 presented for agent use by a web browser client 104. As will be apparent to one skilled in the art, in light of the present disclosure, agent interface 102 on web browser client 104 supports a transaction agent and will, in one embodiment, be a separate and distinct browser interface from that run by a customer. In one embodiment, no client software other than a generic web browser (or, more simply, a web browser or browser) is needed to support the agent interface for the host application. Agent interface 102 includes a communication toolbar 110, screen tabs 120, a persistent dashboard 130, a pseudo-real-time communication window 180 and a base view 140. Base view 140 contains a knowledge base search window 160. Communication toolbar 110, screen tabs 120 and knowledge base search window 160 are not essential for the operation of the present invention. Knowledge base search window contains a reference list 166 and a displayed reference 168 as well as a search entry box 170 and a search button 164. Base view 140 represents a display window in which application data are displayed, such that persistent dashboard 130 provides context information related to the application data and remains visible (persistent) in spite of changes to base view 140.

Communication toolbar 110 enables an agent to communicate via multiple communication channels, such as e-mail, telephone, facsimile, text-based pseudo-real-time communication and wireless messaging. Screen tabs 120 enable an agent to navigate among various types of application data.

Pseudo-real-time communication window 180 supports (alternatively labeled chat window 180) communication between a customer and an agent through text-based messaging, for example, which can include transmission of messages containing a markup language (e.g., HTML). In some embodiments, the pseudo-real-time communication window can additionally support moving video and audio communication. A customer information pane 162 provides an example of a customer attribute display for communicating information, some of which is provided as customer input, relevant to a customer interaction, such as a username 171, which may contain any identifier used to communicate with a customer, such as a customer's name, username or handle. An area 173 broadly represents a product or service type of interest to the customer on the basis of the customer's indication of interest or data previously stored in relation to the customer. A subarea 174 more narrowly defines the product or service type of interest to the customer on the basis of the customer's indication of interest or data previously stored in relation to the customer. A product 175 defines the specific offering of interest to the customer on the basis of the customer's indication of interest or data previously stored in relation to the customer. A summary 176 provides a brief description of the problem that the customer is trying to solve. Location identifier 177 indicates the location of the user, for instance, with a ZIP code. An action pulldown menu 167 enables an agent to quickly access actions that may be relevant to the customer's situation, such as preparation of a service request. A pseudo-real-time communication text entry box 172 allows the agent to enter text for transmission to a customer.

A session window 178 displays a record of transmissions between an agent and a customer. A toolbar 165 between pseudo-real-time communication text entry box 172 and session window 178 allows for the placement of buttons, such as transmit button 106.

In the exemplary embodiment shown in FIG. 1, persistent dashboard 130 includes various data fields such as contact name 131, company 132, phone 133, e-mail 134, current router 135, interest 136, and customer time 137. Persistent dashboard 130 also includes customer history combo box 138, which enables the agent to view in base view 140 the history of previous communications with the customer whose information is displayed in persistent dashboard 130. As mentioned above, the data fields included in a persistent dashboard, such as persistent dashboard 130, are configurable according to the present invention. For example, an account number, customer's local time, or other relevant context information can be selected to be displayed in persistent dashboard 130. Furthermore, customer dashboard 130 may be configured to include, for example, Previous and Next buttons (not shown) to enable scrolling to and from information related to previous activity of the agent using the host application, such as calls that the agent had previously attended to during a session using the host application.

In the example embodiment shown, persistent dashboard 130 is visible as a separate frame below the communications toolbar 110 and screen tabs 120 and above the frame including base view 140. In base view 140, the agent can navigate among various types of application data and/or different screens and view of agent interface 102, while persistent dashboard 130 provides a persistent view of context information related to the application data presented in base view 140. For example, the customer service agent can quickly navigate to information related to the active customer in persistent dashboard 130 by selecting from the combo box 138 of persistent dashboard 130. The list of views to which the agent can navigate is customizable and, for example, can include one or more of the following:

Contact—Activities (default)
Contact—Activity Plans
Contact details
Contact—Service Requests
Contact—Agreements
Contact—Entitlements
Contact—Campaigns
Contact—Opportunities.

When a view is selected, one or more records related to the active customer are displayed in base view 140.

In one embodiment of the present invention, a website for a customer provides access to a repository of information in a knowledge base. As is described with respect to FIG. 9, a customer interface provides a search utility for allowing the customer to search the knowledge base and retrieve data. Searches are optionally tuned to refine results on the basis of data relating to the customer. During the customer's interaction with the search utility, data is gathered, both from the customer and from a database, which is used to populate persistent dashboard 130 and customer information pane 162. Persistent dashboard 130 provides a stable view of certain key aspects of customer information that provides continuity and stability to the interaction as the data in base view 140 and pseudo-real-time communication window 180 evolves. The data gathered to populate persistent dashboard 130 and customer information pane 162 is also used to refine search results performed by an agent at the request of the customer.

When the customer requests a pseudo-real-time communication with an agent, persistent dashboard 130 and customer information pane 162 are populated with the gathered data that is passed in the pseudo-real-time communication request. A search is also performed, using the data from persistent dashboard 130 and customer information pane 162. Reference list 166 is populated with the results of the search, and an agent can select a reference to be shown in a window as displayed reference 168. The search performed to populate reference list 166 and the references displayed (as well as their manner of display) are configurably altered on the basis of the searches performed by the customer prior to the initiation of a pseudo-real-time communication session and the results viewed by the customer.

The context information displayed in persistent dashboard 130 is changed in response to certain actions, which are referred to herein as changes in context. For example, a change in context can include receiving a communication event, obtaining data entered by a customer, focusing on a data record, and selecting a search results record. Actions such as switching to a new screen or view of the agent interface, or viewing a different type of application data, are not considered to trigger changes in context unless accompanied by one of the aforementioned context-changing actions. In one embodiment of the present invention, a new search is performed and references displayed in reference list 166 are updated in response to configurably-selected changes in context. Changing of the view or viewing of a different type of data at base window 140 followed by selection of an update button (not shown) on the persistent dashboard 130 also changes the context of the dashboard.

Figures 1B, 1C:
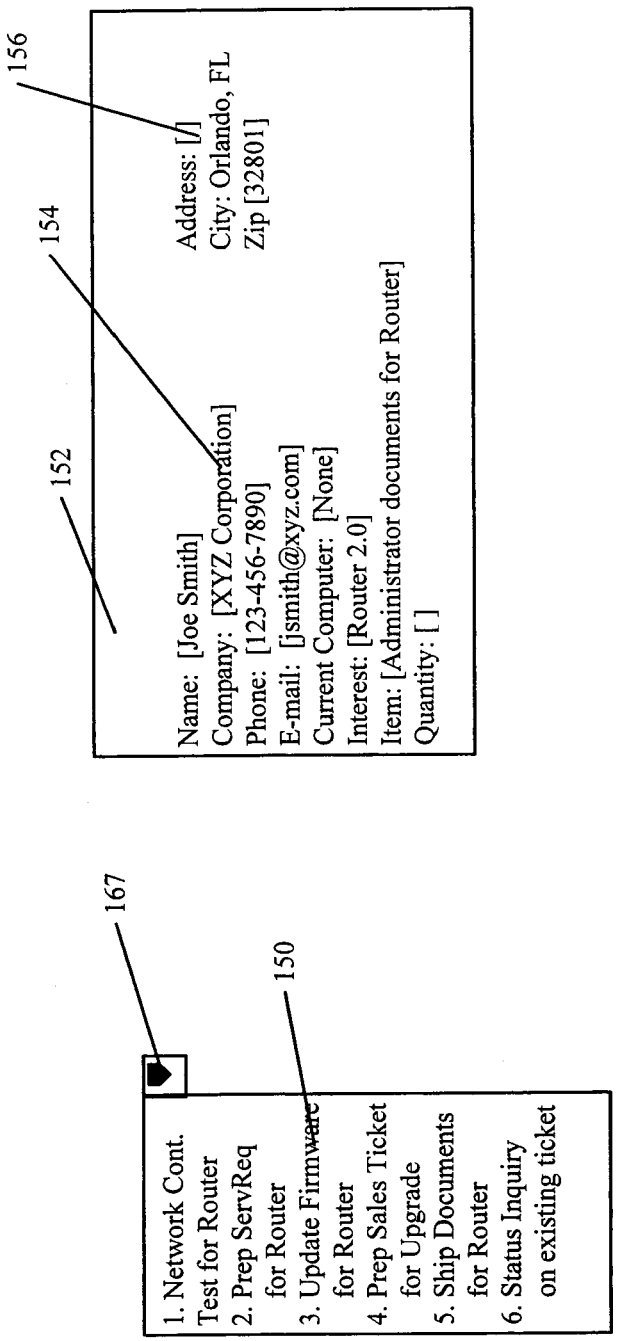
FIG. 1B provides an example of a dynamically configurable agent interface menu in accordance with one embodiment of the present invention.
FIG. 1C provides an example of a pre-populated action request form for use with a dynamically configurable agent interface menu in accordance with one embodiment of the present invention.

Turning now to FIG. 1B, an example of a dynamically configurable agent interface menu in accordance with one embodiment of the present invention is depicted. Action pulldown menu 167, which is an agent interface menu, includes a list of available options 150. In one embodiment of the present invention, the list of options includes a plurality of action items for the agent interface menu, which are ordered using items of customer input such as, for example, subarea 174 and items of stored customer information such as, for example, interest 136. An item of customer input can also include a search string or whether a customer selected a reference presented as a result of a search. Text chat between an agent and a customer can also be considered in populating and ordering action pulldown menu 167, as can any data in any application supported by agent interface 102, such as product recalls or sales promotions. As an example, input by a customer, such as "lost documents" as summary 176 causes agent interface 102 to include "ship documents for router" as an action item in list of available options 150. Selection by an agent "ship documents for router" from list of available options 150, causes agent interface 102 to present an order form for documents, pre-populated with customer information, which speeds completion of the transaction. Such a selection may also cause a database update.

Referring now to FIG. 1C, an example of a pre-populated action request form for use with a dynamically configurable agent interface menu in accordance with one embodiment of the present invention is illustrated. An agent action form 152 contains pre-populated entry blanks 154, which are pre-populated with customer input or stored data items. Unpopulated blanks 156 provide space for the inclusion of additional information about a customer or other information necessary to complete an action. In one embodiment of the present invention, when an agent changes data in pre-populated entry blanks 154 or fills in unpopulated blanks 156, a database update is issued.

Figure 9:
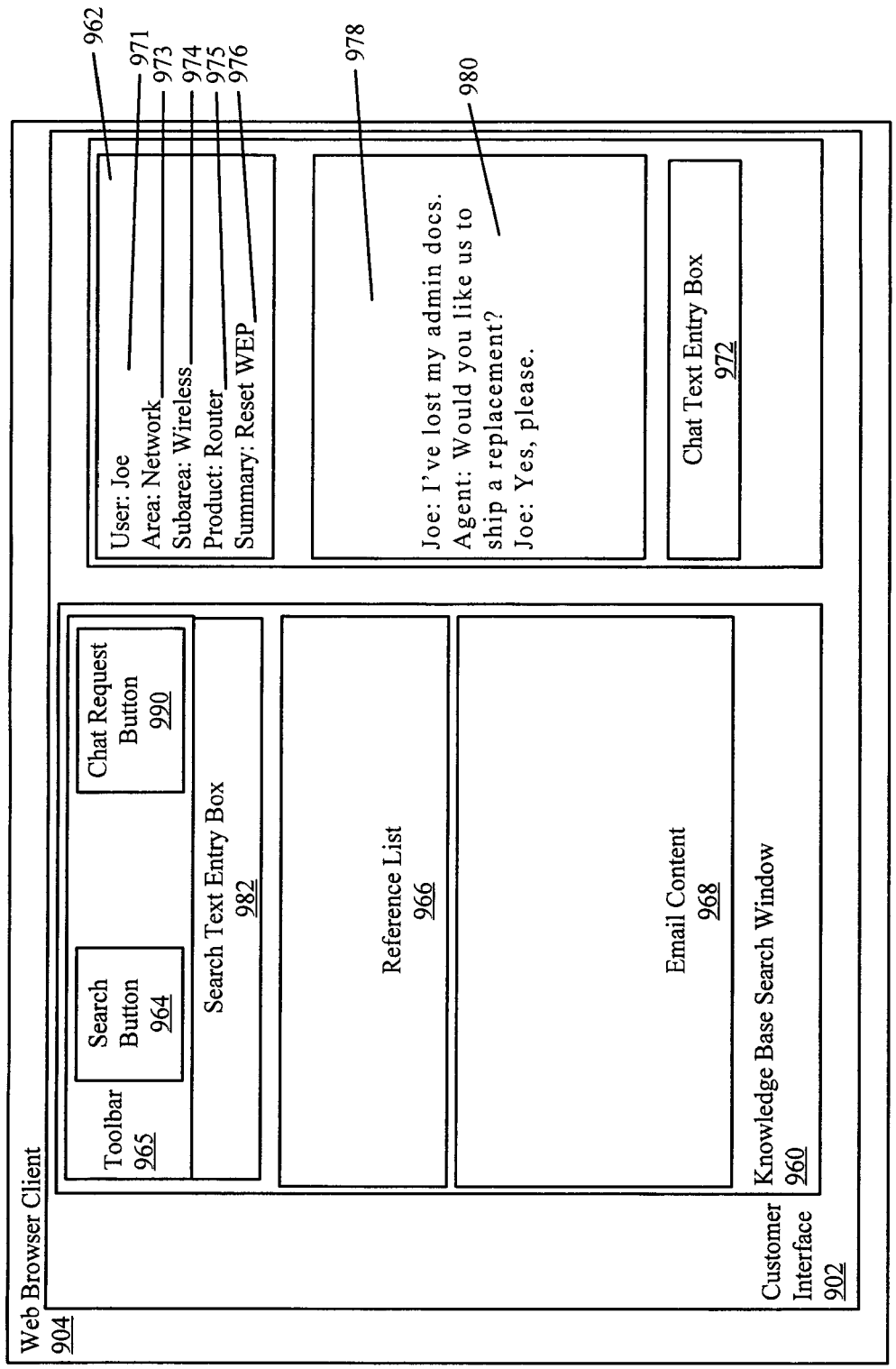
FIG. 9 provides an example of a customer interface including a search utility and a pseudo-real-time communication utility for use with an agent interface including a dynamically configurable agent interface menu in accordance with one embodiment of the present invention.

FIG. 9 provides an example of a customer interface including a search utility and a pseudo-real-time communication utility for use with an agent interface including a dynamically configurable agent interface menu in accordance with one embodiment of the present invention. A web browser client 904 supports the presentation of a pseudo-real-time communication window 980 and a knowledge base search window 960 contained within a customer interface 902. In one embodiment, no client software other than a web browser is needed to run the customer interface 902 for the host application. Knowledge base search window 960 contains a reference list 966 and a displayed reference 968.

Pseudo-real-time communication window 980 supports communication between a customer and an agent through text-based messaging, as described above. In some embodiments, the pseudo-real-time communication window can additionally support live video and audio communication. A customer information pane 962 provides an interface for a customer to enter information relevant to a customer interaction, such as a username 971, which may contain any identifier used to communicate with a customer, such as a customer's name, username or handle. An area 973 broadly represents a product or service type of interest to the customer on the basis of the customer's entry or selection of an interest or data previously stored in relation to the customer. A subarea 974 more narrowly defines the product or service type of interest to the customer on the basis of the customer's entry or selection of an interest or data previously stored in relation to the customer. A product 975 defines the specific offering of interest to the customer on the basis of the customer's entry or selection of an interest or data previously stored in relation to the customer. A summary 976 provides a brief description of the problem that the customer is encountering.

All of this information, as provided by the customer or updated in reference to a database, can be used to populate persistent dashboard 130 and customer information pane 162. Further, any of the information supplied in can be used to populate and order action pulldown menu 167. A session window 978 displays a record of transmissions between an agent and a customer during a pseudo-real-time communication session, the content of which can be used to populate and order action pulldown menu 167. A customer enters transmission text for a pseudo-real-time communication session through chat text entry box 972.

Knowledge base search window 960 contains a reference list 966 and a displayed reference 968, as well as a search text entry box 982 and a toolbar 965, which allows for the placement of buttons, such as search button 964 and chat request button 990. A search text entry box 982 allows a customer to enter search terms, which can be used to populate and order action pulldown menu 167.

When a customer enters a search string in search text entry box 982 and presses search button 964, results are returned to reference list 966. A customer can select a result in reference list 966 to display a reference, and this selection can be used to populate and order action pulldown menu 167. If the displayed reference 968 proves unsatisfactory, the customer may click another reference in reference list 966 for display, and this rejection can also be used to populate and order action pulldown menu 167.

In one embodiment, when an incoming communication arrives and notification is provided to the agent by communications toolbar 110, persistent dashboard 130 is automatically updated with key information about the caller, such as the contact name and customer's local time. While this information enables the agent to greet the customer using the proper salutation, the host application retrieves further information about the contact and displays customer-specific information. As persistent dashboard 130 is being populated, a search is also performed, using the data from persistent dashboard 130 and customer information pane 162. Reference list 166 is populated with the results of the search, and an agent can select a reference to be shown in a window as displayed reference 168.

Figure 2:
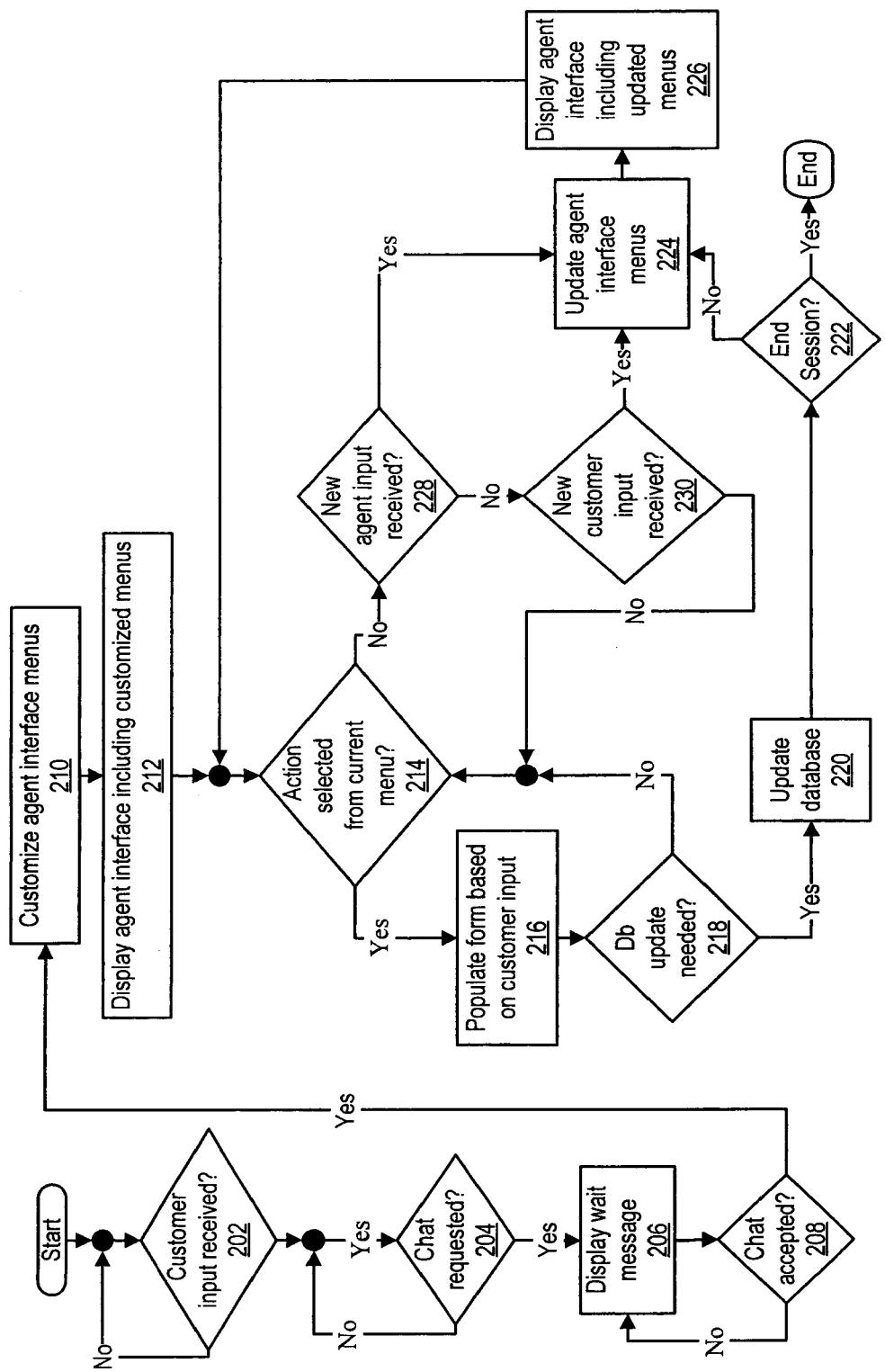
FIG. 2 is a flowchart describing the operation of one embodiment of an agent interface including a dynamically configurable agent interface menu in accordance with the present invention.

FIG. 2 is a flowchart describing the operation of one embodiment of an agent interface including a dynamically configurable agent interface menu in accordance with the present invention. The process starts at step 202, which depicts customer interface 902 determining whether customer input has been received. The process next moves to step 204. Step 204 illustrates customer interface 902 determining whether pseudo-real-time communication, e.g. chat, has been requested. The process then proceeds to step 206, which depicts customer interface 902 displaying a wait message. The process next moves to Step 208. Step 208 illustrates agent interface 102 determining whether an agent has accepted a chat request.

The process then proceeds to step 210, which depicts agent interface 102 customizing agent action pulldown menu 167. In one embodiment of the present invention, any user input to customer interface 902 can be used to select and order items included in list of available options 150. In some embodiments of the present invention, in addition to user input, stored data specific to a customer, such as a customer history, can be used to select and order items included in list of available options 150. In some embodiments of the present invention, in addition to user input, stored data not specific to a customer, such as recall notices or other product or service information, can be used to select and order items included in list of available options 150. Such data not specific to a customer can be stored in a product database or application data, or even encoded as metadata in references from a knowledge base that are displayed in reference list 166.

The process next moves to step 212, which illustrates web browser client 104 displaying agent interface 102 including agent action pulldown menu 167. The process then proceeds to step 214, which depicts agent interface 102 determining whether an agent has selected an action from agent action pulldown menu 167. If agent interface 102 determines that an agent has selected an action from agent action pulldown menu 167, then the process next moves to step 216. Step 216 illustrates agent interface 102 displaying and populating agent action form 152 with stored data and user input.

The process next moves to step 218, which illustrates agent interface 102 receiving input and determining whether any input or correction to agent action form 152 necessitates a database update. If agent interface 102 determines that no input or correction to agent action form 152 necessitates a database update, then the process returns to step 214, which is described above. If agent interface 102 determines that any input or correction to agent action form 152 necessitates a database update, then the process moves to step 220. Step 220 illustrates agent interface 102 updating at database, which will be described below.

The process next proceeds to step 222, which depicts agent interface 102 determining whether it is time to end a session. If agent interface 102 determines that it is time to end a session, then the process ends. If agent interface 102 determines that it is not time to end a session, then the process proceeds to step 224. Step 224 depicts agent interface updating list of available options 150 in agent action pulldown menu 167. Updates can be made in response to the selection performed in step 214, the information received in the form presented in step 216, or any other data received during a session, including chat through chat window 180. The process next moves to step 226, which depicts illustrates web browser client 104 displaying agent interface 102 including updated agent action pulldown menu 167. The process then returns to step 214, which is described above.

Returning to step 214, if agent interface 102 determines that an agent has not selected an action from agent action pulldown menu 167, the process next moves to step 228. Step 228 depicts agent interface 102 determining whether any new agent input has been received. If agent interface 102 determines that new agent input has been received, then the process next moves to step 224, which is described above. If agent interface 102 determines that no new agent input has been received, then the process proceeds to step 230, depicts agent interface 102 determining whether any new customer input has been received. If agent interface 102 determines that new customer input has been received, then the process next moves to step 224, which is described above. If agent interface 102 determines that no new customer input has been received, then the process returns to step 214, which is described above.

Figure 3:
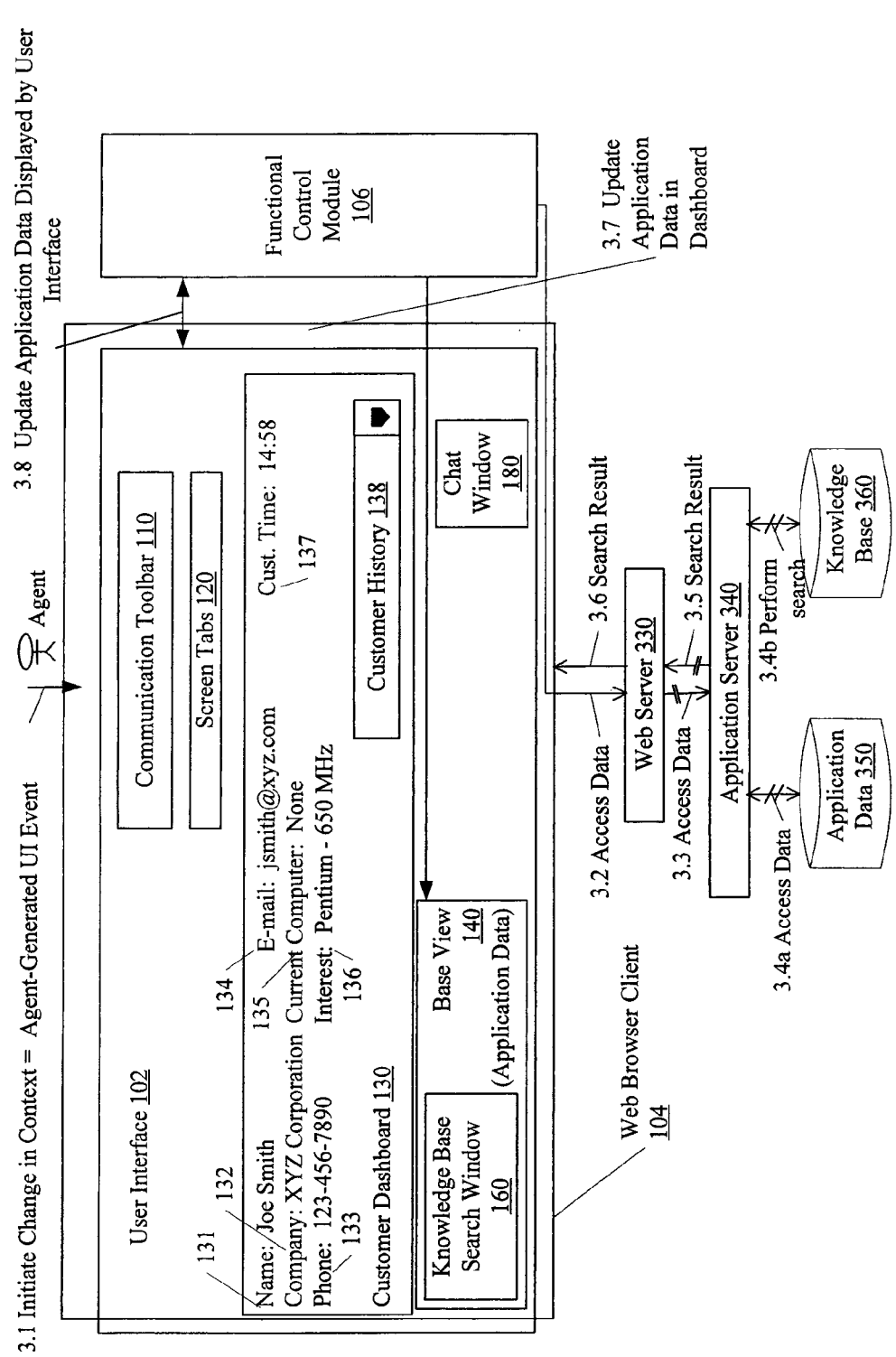
FIG. 3 shows actions taken when an agent interface including a dynamically configurable agent interface menu in response to agent input in accordance with one embodiment of the present invention.

FIG. 3 shows actions taken when an agent interface including a dynamically configurable agent interface menu in response to agent input in accordance with one embodiment of the present invention. When an agent selects an action from list of available options 150 in agent action pulldown menu 167, a query of application data 350 is initiated, which in turn enables generation of agent action form 152. In action 3.1, the agent initiates generation of agent action form 152 by selecting an action from list of available options 150 in agent action pulldown menu 167. In action 3.2, functional control module 106, which is actually housed on application server 340 but displayed separately for purposes of clarity, passes a request to access data to web server 330. In action 3.3, web server 330 passes the request to access application data to application server 340. Application server 340 includes a application data query business service (not shown) to assist with obtaining data to push to base view 140. As noted by the broken arrow connecting web server 330 to application server 340, intermediate software modules may be present between web server 330 and application server 340.

Application server 340 accesses application data 350, such as customer data from a customer, previous search queries by agent and customer and items viewed by customer and agent, in action 3.4a and may, in some embodiments, perform a search of knowledge base 360 in Action 3.4b. As noted by the broken arrows connecting application server 340 to application data 350 and knowledge base 360, several intermediate modules may be present, such as a database server (not shown). Application server 340 provides query results to populate agent action form 152 to web server 330 in action 3.5, and web server 330 provides query results to web browser client 104 in action 3.6. In action 3.7, functional control module 106 updates data in base view 140 with query results from which base view 140 generates generation of agent action form 152. In action 3.8, functional control module 106 updates any additional application data displayed by agent interface 102.

Figure 4:
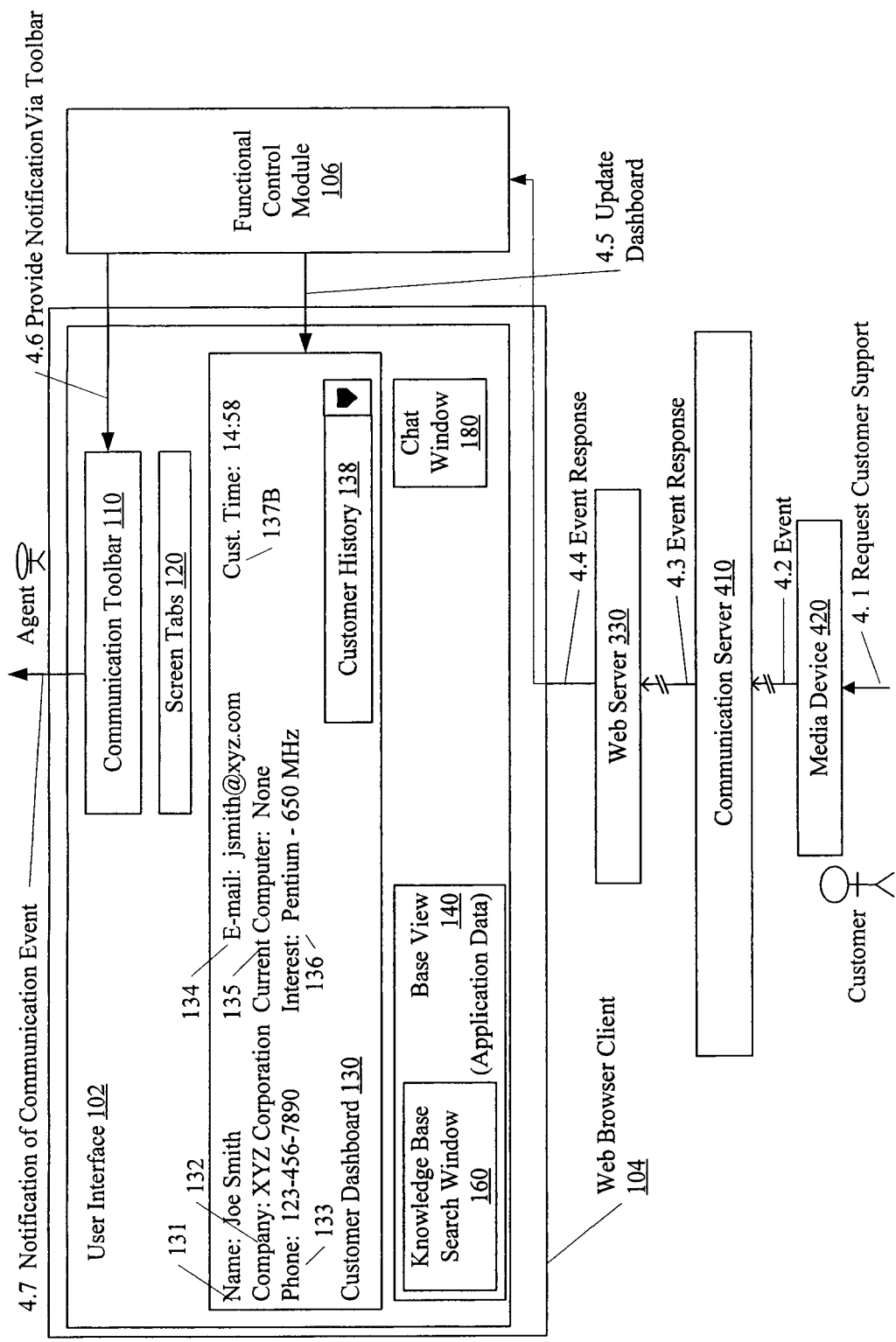
FIG. 4 shows actions taken to support an agent interface including a dynamically configurable agent interface menu in response to an incoming communication event in accordance with one embodiment of the present invention.

FIG. 4 shows actions taken to support an agent interface including a dynamically configurable agent interface menu in response to an incoming communication event in accordance with one embodiment of the present invention. In action 4.1, the customer places a request for customer support, such as pseudo-real-time communication, using media device 420 supporting pseudo-real-time communication window 980. A request for customer support will typically include any known information about the customer, including data gathered to populate persistent dashboard 130 and customer information pane 162, as well as any search strings resulting from search input by the customer at search entry text box 982 and any results viewed as displayed reference 968. In one embodiment, agent interface 102 can use any of this information to populate and order list of available options 150 in agent action pulldown menu 167.

The request for customer support is provided via a series of intermediate software modules (not shown) to communication server 410. Communication server 410 receives the event and provides an event response in action 4.3 to web server 330 with information to populate and order list of available options 150 in agent action pulldown menu 167. Again, as indicated by the broken arrow connecting communication server 410 and web server 330, intermediate software modules may exist between communication server 410 and web server 330. Web server 330 provides the event response information to populate and order list of available options 150 in agent action pulldown menu 167 to web browser client 104, and functional control module 106 updates persistent dashboard 130 with context information related to the incoming communication event. This context information may include, for example, the name of the customer initiating the telephone call or a pseudo-real-time communication using customer interface 902. In action 4.6, functional control module 106 provides notification of the incoming communication event to communication toolbar 110. Communication toolbar 110 then provides notification of the communication event to the customer service agent, for example, by causing a button on communication toolbar 110 to blink.

Figure 5:
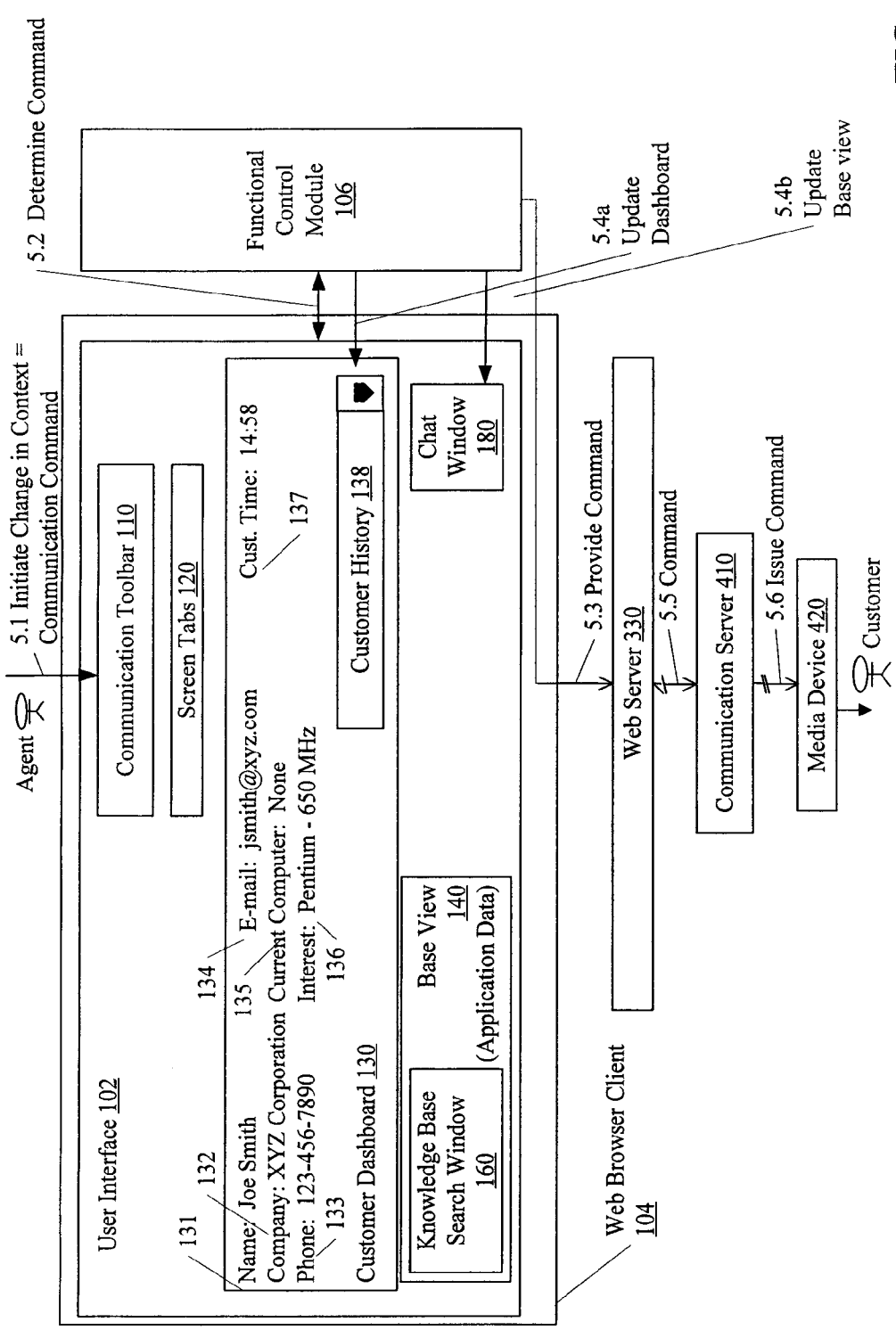
FIG. 5 shows actions taken when updating the persistent dashboard in conjunction with an outgoing communication command from an agent interface including a dynamically configurable agent interface menu in accordance with one embodiment of the present invention.

FIG. 5 shows actions taken when updating the persistent dashboard in conjunction with an outgoing communication command from an agent interface including a dynamically configurable agent interface menu in accordance with one embodiment of the present invention. Issuing a communication command is similar to the agent-generated agent interface events described with reference to FIG. 3, although other software modules, such as communication server 410 of FIG. 4, are involved. In action 5.1, the customer service agent clicks an Accept. Pseudo-real-time communication button (not shown) on communication toolbar 110 to accept a pseudo-real-time communication. The resulting communication command produces a change in context that is used to update persistent dashboard 130 and triggers generation of list of available options 150 in agent action pulldown menu 167, as explained above, which updates pseudo-real time communication window 180. Updating persistent dashboard 130 and pseudo-real time communication window 180 may involve additional modules not shown, such as those of application server 340 of FIG. 3, to perform searches and access application data related to the communication command. In action 5.2, functional control module 106 determines the communication command to be issued. In action 5.3, functional control module 106 provides the command to be issued to web server 330. Web server 330 provides a pseudo-real-time communication initiation command to communication server 410 and additionally executes a query similar to actions 3.2-3.6 of FIG. 3. In action 5.4a, functional control module 106 updates persistent dashboard 130 with context information related to the pseudo-real-time communication accepted. In action 5.4b, functional control module 106 updates pseudo-real time communication window 180 with list of available options 150 in agent action pulldown menu 167 triggered by pseudo-real-time communication acceptance. Communication server 410 then issues a pseudo-real-time communication initiation command in action 5.6, via several intermediate software modules (not shown), to media device 420.

Figure 6:
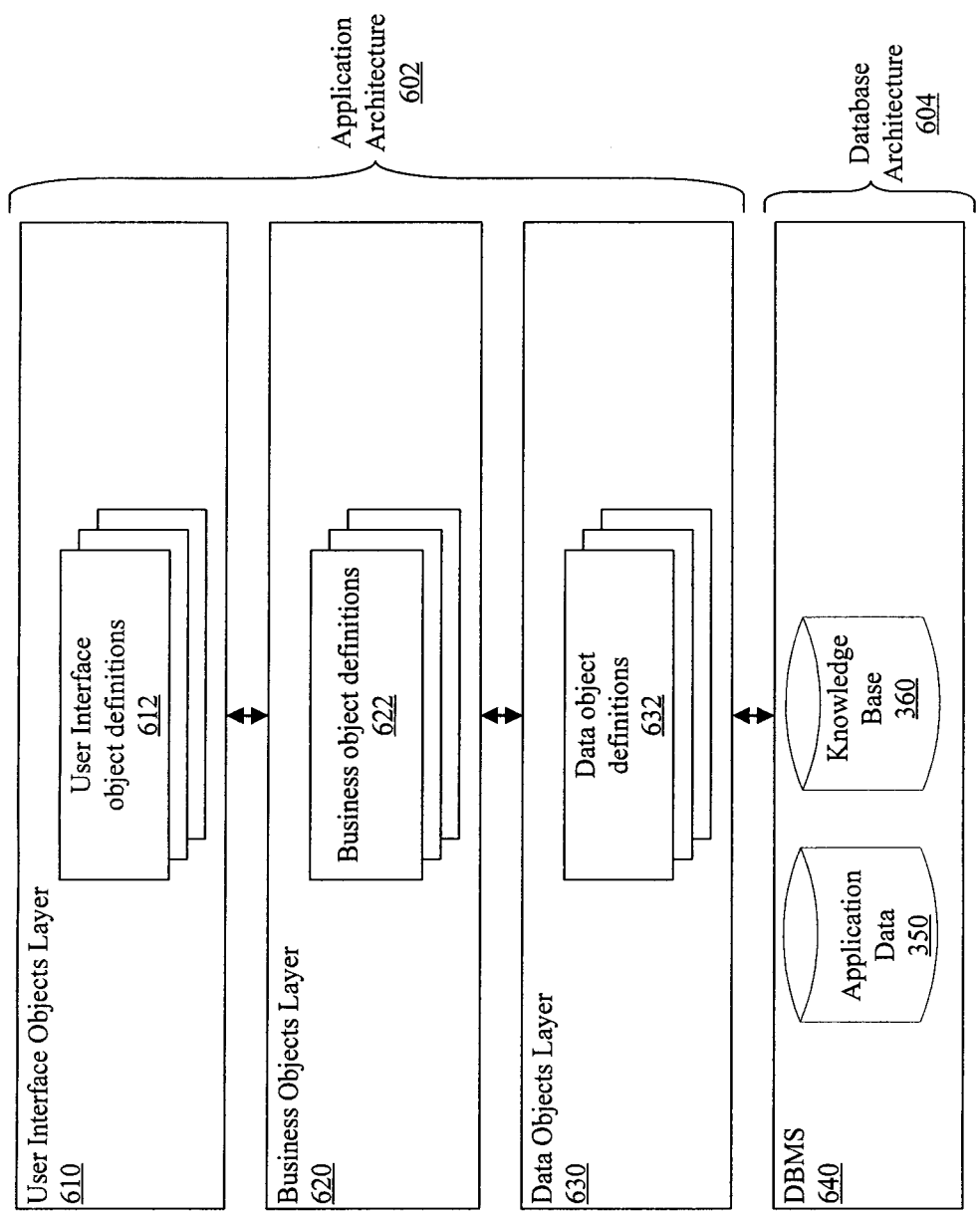
FIG. 6 is a diagram of a layered architecture in which an embodiment of the search utility can be implemented.

FIG. 6 is a diagram of a layered architecture in which an embodiment of the search utility can be implemented and support the operations depicted in FIG. 3, FIG. 4 and FIG. 5. Application architecture 602 includes user interface objects layer 610, business objects layer 620, and data objects layer 630. User interface objects layer 610 includes one or more user interface object definitions 612. An example of a user interface object definition is a view definition for list of available options 150 in agent action pulldown menu 167. Business objects layer 620 includes one or more business object definitions 622. An example of a business object definition is a contact business object definition, which is used to populate persistent dashboard 130 and customer information pane 162. Data objects layer 630 includes one or more data object definitions 632. An example of a data object definition is a schema for a database table. Underlying database architecture 604, which is used to store application data, includes a database management system (DBMS) 640 containing knowledge base 360.

Figure 7:
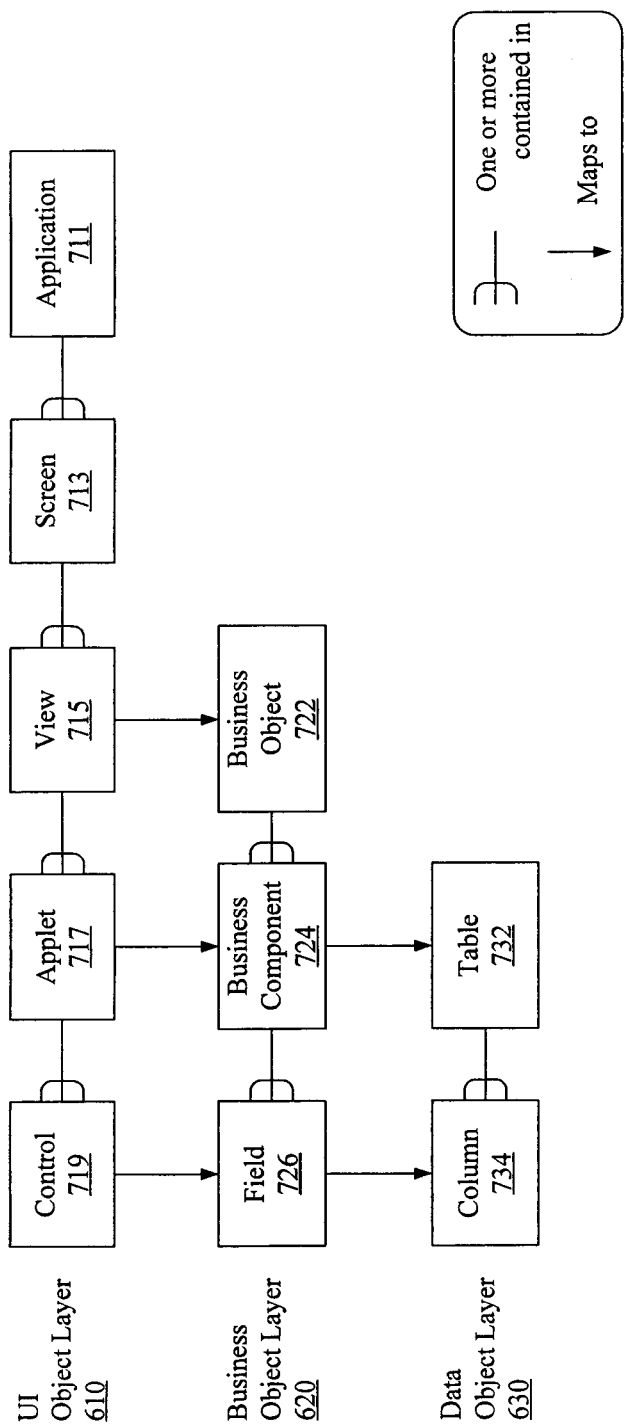
FIG. 7 is a diagram of object layers and object definitions according to the layered architecture of FIG. 6.

FIG. 7 is a diagram of object layers and object definitions according to the layered architecture of FIG. 6. User interface objects layer 610 includes object definitions application 711, screen 713, view 715, applet 717, and control 719. As used herein, an application object definition defines a collection of screens and does not define an application program. Application object definition 711 includes one or more screens 713. Each screen 713 may contain one or more view 715. A view presents one or more applets together at one time in a pre-defined visual arrangement and logical data relationship. Each view 715 may contain one or more applets 717. In the architecture of the present invention, the term applet is used to describe a form including one or more fields and controls, and is distinguishable from the term applet when used to describe, for example, a Java® program referred to as a Java® applet. Each applet 717 may include one or more control 719.

Business objects layer 620 includes business object definition 722, business component definition 724, and field object definition 726. Each business object definition 722 can include one or more business component object definition 724. Each business component object definition 724 may include one or more field object definition 726.

Data object layer 630 includes table object definition 732 and column object definition 734. Each table object definition 732 can include one or more column object definition 734.

As shown in FIG. 7, view object definition 715 of user interface object layer 610 maps to business object definition 722 of business objects layer 620. A mapping indicates a one-to-one relationship between objects defined according to the object definitions. For example, a contact view of agent interface 102 displays data for a contact business object.

As noted above, a view may include one or more applets, and a business object may include one or more business components. Accordingly, applets object definition 717 of user interface object layer 610 maps to business component object definition 724 of business objects layer 620. A particular applet, or form, of agent interface 102 includes data for a particular business component. Furthermore, a business component, such as business component 724, maps to an object definition, such as table object definition 732, of data objects layer 630. Consequently, a particular applet displays data for a particular business component from a particular data table. In at least one embodiment, a "virtual" business component corresponds to a business component for which data are not obtained from a single database table, but instead are the result of a combination of joins with two or more database tables.

Control object definition 719 of user interface object layer 610 maps to field object definition 726 of business objects layer 620. A particular control within an applet corresponds to a field object definition. Furthermore, field object definition 726 maps to column object definition 734 of data object layer 630. Data for a column of a particular table corresponds to a field of the corresponding business component and is displayed within a control in a corresponding applet.

An interface utility, such as list of available options 150 in agent action pulldown menu 167, can be implemented as a separate frame and view below communication toolbar 110 or as part of base view 140 or pseudo-real-time communication window 180 (as shown). Agent action pulldown menu 167 is based on a virtual business component called "agent action pulldown menu" which lies in the instance of a "pseudo-real-time communication window" business object. Examples of object definitions related to a pseudo-real-time communication window, such as agent action pulldown menu 167, are given below:

Agent Action Pulldown Menu Business Object
Agent Action Pulldown Menu Business Component (virtual business component)
Agent Action Pulldown Menu Business Service (controls the functionality)
Agent Action Pulldown Menu Applet (user interface)
Agent Action Pulldown Menu View (user interface)

When updating agent action pulldown menu 167, a SmartScript response or an application program can use an ActionPulldown application program interface (API) for the Agent Action Pulldown Menu Business Service. The ActionPulldown API can be called using the InvokeMethod function of the Agent Action Pulldown Menu Business Service and passing a set of name/value pairs, such as the following:

Source Name: 'Pseudo-Real-Time Communication Window'
BusComp Name: 'ActionPulldown'
RowId: 'availableoptions'

In one embodiment, the InvokeMethod function of the Agent Action Pulldown Menu Business Service is used to call ActionPulldown API for configurable events. For example, an enterprise may define a customized event for which list of available options 150 in agent action pulldown menu 167 is updated and associate the customized event with a button on an applet within the agent interface.

Upon receiving the arguments, the invoked function of the Knowledge Agent Action Pulldown Menu obtains the set of fields configured to be displayed. The involved function then retrieves corresponding data from application databases and knowledge base 360, and populates list of available options 150 in agent action pulldown menu 167.

In one embodiment, list of available options 150 in agent action pulldown menu 167 is configurable. For example, various agent interface changes can be made, such as changing the color, size, location, and adding or removing fields from the display window (applet) displaying real-time pseudo-communication window 180.

A query engine within the host application server is responsible for ensuring that list of available options 150 in agent action pulldown menu 167 is updated whenever needed. In one embodiment, the query engine is implemented as a search engine business service. The query engine business services provides an application program interface (API) that includes a member function to update list of available options 150 in agent action pulldown menu 167 within pseudo-real-time communication window 180. Member functions can correspond to a command definition for a command to, for example, push search results to pseudo-real-time communication window 180. The Action-Pulldown API may further include a command definition for a maintain command to maintain list of available options 150 in agent action pulldown menu 167 until agent action form 152 is completed.

The communication administration views can be pre-configured to call InvokeMethod (with ActionPulldown as a parameter) when a communication event is received, such as an incoming pseudo-real-time communication. Variables are passed as arguments to update pseudo-real-time communication window 180. When InvokeMethod is called with the UpdateKBSearch parameter, the business service member function UpdatefromCTl obtains the list of fields that are configured to be displayed in pseudo-real-time communication window 180. Data to update pseudo-real-time communication window 180 can be passed as parameters and/or queried from appropriate application. Since the persistent dashboard is implemented as a business service, a program calling pseudo-real-time communication window 180 may use a GetService ("KBSearch") command. The program may set up a control to either push information to pseudo-real-time communication window 180 or pull information from pseudo-real-time communication window 180.

Figure 8:
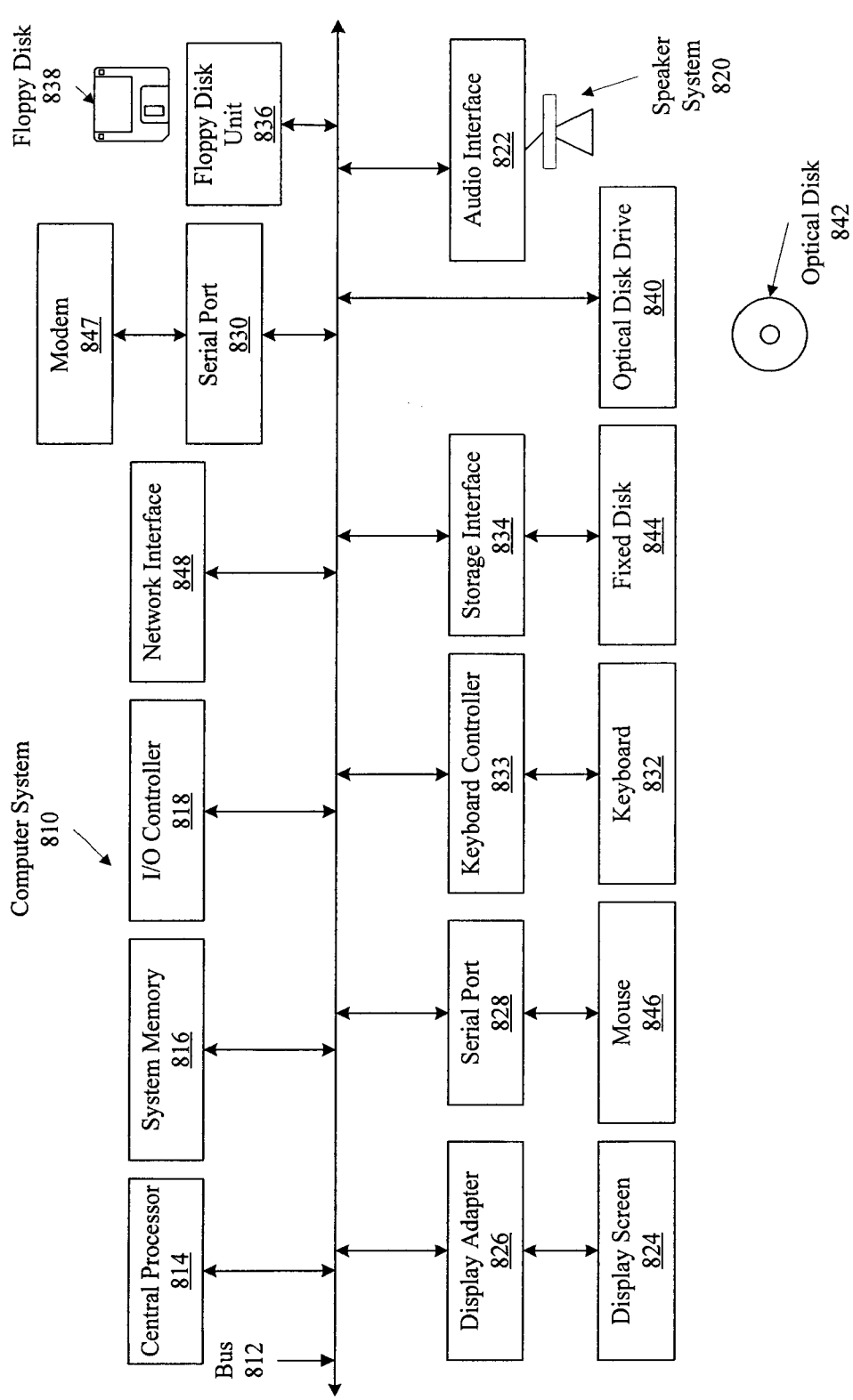
FIG. 8 is a block diagram illustrating a computer system suitable for implementing embodiments of the present invention.

FIG. 8 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or a similar computer-readable storage medium), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834 for interfacing with a computer-readable storage medium such as a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial (or USB) port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 816 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable storage medium, such as a hard disk drive (e.g., fixed disk 844), an optical drive (e.g., CD-ROM or DVD drive 840), floppy disk unit 836 or other storage medium.

Storage interface 834, as with the other storage interfaces of computer system 810, may connect to a standard computer readable storage medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliances, X-window terminals or other such computing devices. The operating system provided on computer system 810 may be MS-WINDOWS®, Mac OS 10®, UNIX®, Linux® or other known operating system. Computer system 810 also supports a number of Internet access tools, including, for example, an HTTP-compliant web browser having a JavaScript interpreter.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of media used to actually carry out the distribution. Examples of signal bearing media include recordable media such as floppy disks and CD-ROM, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
    an application server, wherein
        the application server is configured to be operably coupled to a web server, an application data storage area, and a knowledge base storage area, and
        the application server is further configured to
            access at least a portion of application data stored in the application data storage area, in response to receipt of an access request, wherein the access request is related to a problem of a customer;
    a web browser client configured to run on a client computer and to receive data from the web server; and
    an agent interface configured for presentation by the web server client on a display associated with the client computer,
        wherein the agent interface comprises
            a base view for presenting application data,
            a persistent dashboard for presenting context information related to the application data presented in the base view,
            a pseudo-real-time communication window for pseudo-real-time communication with a customer, and
            an agent interface menu comprising a plurality of action items,
                wherein the plurality of action items are selected and ordered based on rejection of a search result by the customer,
    wherein the application server is further configured to,
        responsive to receipt of a result of a search of the knowledge base storage area,
            the search having been performed in response to a request for a search by the customer and based on customer input, update said agent interface.

2. The apparatus of claim 1, wherein rejection of the search result by the customer is determined based on customer selection of a second search result after selection of the search result.

3. The apparatus of claim 1, wherein
    in response to receipt of the result, the agent interface is configured to update the agent interface menu based, at least in part, on the result.

4. The apparatus of claim 1, wherein
    the application server is further configured to perform the search using, at least in part, an item of stored customer information.

5. The apparatus of claim 1, further comprising:
    a communication server configured to
        receive the customer input from a customer interface running on a second client computer, and
        convey the customer input to the web server.

6. The apparatus of claim 5, wherein
    the agent interface is further configured to receive the customer input from the web server, and
    the access request is sent in response to receipt of the customer input.

7. The apparatus of claim 5, wherein
    the customer input comprises communication input from a communication session between the customer and a customer service agent; and
    the agent interface is configured to
        receive the communication input from the web server via the web browser client, and
        display the communication input in a communication window within the agent interface.

8. The apparatus of claim 1, further comprising a functional control module operably coupled to the agent interface and the web server, wherein
    the functional control module is configured to pass a request by the agent interface to access data to the application server via the web server.

9. The apparatus of claim 8, wherein the functional control module is further configured to:
    receive a result from the access of at least a portion of the application data; and
    update application data displayed by the agent interface.

10. The apparatus of claim 1, further comprising a functional control module operably coupled to the agent interface and the web server, wherein the functional control module is configured to
  receive context information associated with the customer input,
  update the agent interface with the context information, and
  initiate a communication event notification function within the agent interface.

11. The apparatus of claim 10, wherein
the functional control module is configured to update the agent interface with context information by updating the persistent dashboard within the agent interface.

12. The apparatus of claim 10, wherein
the context information comprises a name of the customer, an account number of the customer, or the local time for the customer.

13. The apparatus of claim 10, wherein
the functional control module is configured to initiate the communication event notification function by updating a communication toolbar within the agent interface, and
updating the communication toolbar causes display of a visual indicator indicating an incoming communication.

14. The apparatus of claim 1, wherein
the agent interface is further configured to display an action form in response to selection by the agent of one of the action items,
the action form is related specifically to the selected action item, and
the action form is related to a solution to the problem of the customer.

15. The apparatus of claim 14, wherein
the action form comprises a plurality of input fields, and
the agent interface is further configured to pre-populate, using, at least in part, the result, at least one input field of the plurality of input fields.

16. The apparatus of claim 1, wherein
the result comprises one or more references; and
the application server is further configured to
  update the agent interface in response to receipt of a customer selection of a reference from the one or more references of the result.

17. The apparatus of claim 1, wherein
the application server is further configured to
  re-order the plurality of action items in response to receipt of the result of the search.

18. The apparatus of claim 1, wherein
the application server is further configured to
  select one or more action items for inclusion in the plurality of agent action items in response to receipt of the result of the search.

19. An apparatus comprising:
an application server, wherein
  the application server is configured to be operably coupled to a web server, an application data storage area, and a knowledge base storage area, and
  the application server is further configured to
    access at least a portion of application data stored in the application data storage area, in response to receipt of an access request, wherein the access request is related to a problem of a customer; and
an agent interface configured for presentation on a display associated with the client computer,
  wherein the agent interface comprises
    a base view for presenting application data,
    a persistent dashboard for presenting context information related to the application data presented in the base view,
    a pseudo-real-time communication window for pseudo-real-time communication with a customer, and
    an agent interface menu comprising a plurality of action items,
    wherein the plurality of action items are selected and ordered based on rejection of a search result by the customer,
  wherein the application server is further configured to,
    responsive to receipt of a result of a search of the knowledge base storage area,
      the search having been performed in response to a request for a search by the customer and based on customer input, update said agent interface.

20. The apparatus of claim 19, wherein rejection of the search result by the customer is determined based on customer selection of a second search result after selection of the search result.

* * * * *

UNITED STATES PATENT AND TRADEMARK OFFICE
CERTIFICATE OF CORRECTION

PATENT NO. : 9,692,896 B2
APPLICATION NO. : 14/170035
DATED : June 27, 2017
INVENTOR(S) : Akbar Jaffer et al.

It is certified that error appears in the above-identified patent and that said Letters Patent is hereby corrected as shown below:

On the Title Page

Item (54) and in the Specification, Column 1, Lines 1-2:
"COMMUNICATION DASHBOARD WITH DYNAMICALLY CONFIGURED INTERFACE"
Should read:
-- COMMUNICATION DASHBOARD WITH DYNAMICALLY CONFIGURED AGENT INTERFACE --.

Abstract item (57), Line 5:
"ordering the plurality or more action items"
Should read:
-- ordering the plurality of action items --.

In the Specification

Column 1, Line 67:
"ordering the plurality or more action items"
Should read:
-- ordering the plurality of action items --.

Signed and Sealed this
Fifteenth Day of January, 2019

Andrei Iancu
*Director of the United States Patent and Trademark Office*